US006474857B2

(12) United States Patent
Ott et al.

(10) Patent No.: US 6,474,857 B2
(45) Date of Patent: Nov. 5, 2002

(54) LIGHTING DEVICE FOR THE ILLUMINATION OF A VEHICLE DECOUPLING BAY AND A METHOD FOR PROVIDING THE SAME

(75) Inventors: Alfred Ott, Gaeufelden; Uwe Frederking, Leinfelden; Wener Heinz, Tiefenbronn; Karsten Eichhorn, Ennigerloh; Ewald Topp, Anroechte; Gerhard Jost, Arnsberg; Michael Wuestefeld, Lippstadt; Stefan Wiesner, Erwitte, all of (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/748,245

(22) Filed: Dec. 27, 2000

(65) Prior Publication Data

US 2001/0014026 A1 Aug. 16, 2001

(30) Foreign Application Priority Data

Dec. 27, 1999 (DE) ........................................ 199 63 336

(51) Int. Cl.[7] .............................. F21V 8/00; B60Q 1/04

(52) U.S. Cl. ........................ 362/551; 362/511; 362/555

(58) Field of Search ................................ 362/551, 555, 362/559, 511, 235

(56) References Cited

U.S. PATENT DOCUMENTS

| | | | | | |
|---|---|---|---|---|---|
| 5,499,166 | A | * | 3/1996 | Kato et al. | 362/511 |
| 5,601,354 | A | * | 2/1997 | Horii et al. | 362/511 |
| 5,685,627 | A | * | 11/1997 | Kato | 362/511 |
| 5,921,671 | A | * | 7/1999 | Okuchi et al. | 362/511 |

FOREIGN PATENT DOCUMENTS

DE 0678699 B1 9/1998

* cited by examiner

*Primary Examiner*—Thomas M. Sember
(74) *Attorney, Agent, or Firm*—Birch, Stewart, Kolasch & Birch, LLP

(57) ABSTRACT

The invention relates to a lighting device for vehicles that envisages a light-decoupling element in a decoupling bay of the vehicle. The light-decoupling element is fed by a light source arranged at a distance therefrom. A light guide is envisaged between the light source and the light decoupling element. An additional decoupling bay lighting device is envisaged to achieve a visually appealing appearance of the decoupling bay and to illuminate the decoupling bay of the light-decoupling element.

25 Claims, 4 Drawing Sheets

LIGHTING DEVICE FOR THE ILLUMINATION OF A VEHICLE DECOUPLING BAY AND A METHOD FOR PROVIDING THE SAME

BACKGROUND OF THE INVENTION

1. Field of the Invention

The present invention relates to a lighting device for vehicles with an optical fiber that guides a light emitted from a light source into a decoupling bay of the vehicle, with at least one light-decoupling element coupled in the decoupling bay and connected to an end of the optical fiber. The light decoupling element emits the light according to a predetermined light distribution into the environment.

Moreover, the invention relates to a method of illuminating a decoupling bay of a vehicle, whereby light is transmitted from a light source to a light-decoupling element arranged in the decoupling bay via an optical fiber or light guide to facilitate decoupling of the light according to a predetermined/desirable distribution of light.

2. Related Art

From EP 0 678 699 B1, a lighting device for vehicles is known which has light decoupling elements formed to allow the generation of a predetermined distribution of light e.g. to provide low beam, high beam or fog light functionality. The light decoupling elements are arranged on peripheral areas of the vehicle's body shell. The light-decoupling element is connected to an optical fiber; a light generated by a light source is coupled to the other end of the optical fiber and transmitted to the light-decoupling element via the optical fiber. This type of lighting system facilitates a space saving decoupling of the light because the contour of a body opening may be adapted to the contour of the light decoupling element. Alternatively, however, it is possible to arrange the light decoupling elements like a headlight casing in a common decoupling bay. Appropriately, this decoupling bay is covered with a preferably translucent covering pane.

SUMMARY OF THE INVENTION

An object of the present invention is to further develop a lighting device for vehicles, which provides a variable visual appearance of a light decoupling element and/or a decoupling bay.

To achieve the object of the present invention, the lighting device in accordance with the present invention includes a decoupling bay lighting device for the illumination of the decoupling bay and/or the light-decoupling element that is integrated in the decoupling bay.

An advantage of the lighting device in accordance with the present invention is that in the decoupling bay a decoupling bay lighting device is provided in a space-saving manner that facilitates the illumination of the entire decoupling bay or parts thereof in accordance with design and technical requirements. Thus, an esthetically pleasing appearance is rendered to the decoupling bay and/or a light-decoupling element. The decoupling bay lighting device is designed such that a homogeneous illumination of the decoupling bay is ensured. In addition, the decoupling bay lighting device can visually highlight the appearance of various elements, specifically, the contour of individual components such as the light-decoupling device.

The present invention achieves illumination of the decoupling bay by way of light engineering. In addition, actual illumination the light-decoupling element arranged in the decoupling bay is also within the purview of the present invention.

The illumination in the off-state of the light-decoupling element is realized by implementing via light engineering a "staging" of the decoupling bay receiving the light-decoupling element. However, illumination in the on-state of one or several light decoupling elements whereby—specifically if the decoupling bay lighting device is arranged in the peripheral section of the decoupling bay—an ambient lighting of the decoupling bay is provided which has a favorable effect on the subjective visual feeling and/or perception of approaching road users. The decoupling bay lighting device hence contributes to the homogenization of the light irradiated by means of the light decoupling elements.

In accordance with a preferred embodiment of the lighting device a decoupling bay lighting device is arranged in the peripheral section of a light-decoupling element. This peripheral section is visually ineffective for the predetermined illumination function generated by the light-decoupling element such that the decoupling bay lighting device can be arranged in a space-saving way.

In accordance with a preferred embodiment of the decoupling bay lighting device, the latter has an additional light source and/or an additional light-decoupling element coupled with an additional light guide. The additional light source and/or the additional light decoupling element can in turn have their own optical control elements that achieve a desired visual effect in concert with the visually effective contour of light decoupling element. Specifically, the additional light source and/or the additional light decoupling element can be arranged in such a way that a corresponding visual effect is generated above a light/dark limit of a light distribution generated by the light decoupling element, thereby creating an improved effect of the ambient lighting of the decoupling bay. With this embodiment, the light-decoupling element is preferably fitted with a spherical contour on the face to offer a lower beam function.

The visually effective area of a light-decoupling element can be exploited advantageously for the decoupling bay lighting device to obtain an increased brilliance of the light-decoupling element under esthetic aspects. The light irradiated from the decoupling bay lighting device is guided and/or totally reflected through the light decoupling element such that it can emerge essentially from the face of the light decoupling element. By coloring the additional light decoupling element and/or providing a colored additional light source, the light decoupling element and/or the decoupling bay can be given a colored appearance.

A variable illumination of the decoupling bay independent of the type of light decoupling element can be ensured advantageously by providing the decoupling bay lighting device as an active light source (additional light source etc.). The "additional light" can be employed specifically for the illumination of the desired part of the bay.

In accordance with a development of the invention, further additional light control elements can be arranged inside the decoupling bay connected with the light-decoupling element and/or with the additional light source and/or the additional light-decoupling element. The additional light control element allows a distribution of the "additional light" inside the decoupling bay such that a homogeneous illumination of the decoupling bay and/or a homogeneous appearance of the decoupling bay is ensured. Preferably the additional light control element is provided as a translucent carrier plate that also assumes a supporting function for the light decoupling element and/or the additional light source and/or the additional light-decoupling element.

In accordance with additional embodiments of the decoupling bay lighting device pursuant to the present invention, there can be means envisaged to change the appearance of the light decoupling element and/or the decoupling bay in a desired way exclusively by exploiting an external light entering the decoupling bay from the ambience.

In accordance with a first embodiment, a peripheral section of the light-decoupling element can be fitted with a coating with a reflecting effect on light rays roaming inside the light-decoupling element. If the coating is arranged at the rear of the light-decoupling element, this can achieve a lighting and/or increased brilliance of the light-decoupling element. If a colored coating is used, the light-decoupling element can be provided with a corresponding colored character.

In accordance with another variant of the present invention, the decoupling bay lighting device is provided in the form of an external light collector extending inside or outside the light decoupling element and collecting the external light entering from the ambience into the decoupling bay and/or the light decoupling element and guiding it onto the front of the light decoupling element by means of a total reflection and/or refraction. The external light collector that is integrated into the light-decoupling element, an area of the light-decoupling element, which is effective for the actual illumination function, can be advantageously used to collect and specifically decouple the external light. Moreover, because the external light collector projects from the light-decoupling element, a larger portion of the external light may be collected and used for visually highlighting the light-decoupling element.

In accordance with another variant of the present invention, the decoupling bay lighting device is formed by means of coloring an area of the light-decoupling element that is visually ineffective for the illumination function. This represents a specifically simple way of a colored highlighting of the light-decoupling element.

Another aspect of the present invention is to provide a method for the illumination of a decoupling bay of a vehicle that offers a simple and reliable method for a visual highlighting of the decoupling bay.

The method in accordance with the present invention includes a decoupling bay lighting device arranged in the decoupling bay that is actuated for the ambient and/or background illumination of the decoupling bay irrespective of the actuation of the light decoupling element.

The advantage of the method in accordance with the present invention includes the fact that an additional decoupling bay lighting device that is controlled independently of light decoupling elements provides for variability in the esthetic shaping of the decoupling bay. Moreover, the decoupling bay lighting device can cause an ambient lighting which—by adding to the light decoupling element's light radiation causing the illumination function—has a favorable effect on the human eye in the sense of a reduction of the concentrated overall appearance of the light radiation.

In accordance with the method according to the present invention, it is envisaged to have the decoupling bay lighting device coupled with the starting process of the vehicle such that a continuous and constant illumination of the decoupling bay is ensured. Switching on the decoupling bay lighting device can e.g. take place simultaneously with turning the ignition key such that the switching on of the decoupling bay lighting device can take place automatically and with a reduced effort. Hence, the vehicle is easier to recognize for approaching road users and thus road safety is also increased.

The light irradiated from the decoupling bay lighting device can be irradiated diffusely or specifically directed into a predetermined direction, whereby preferably the intensity of the light and/or the luminance is essentially lower than the intensity of the light and/or the luminance of the light irradiated from the light decoupling element.

Examples of embodiments of the invention are explained below in more detail by means of several drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
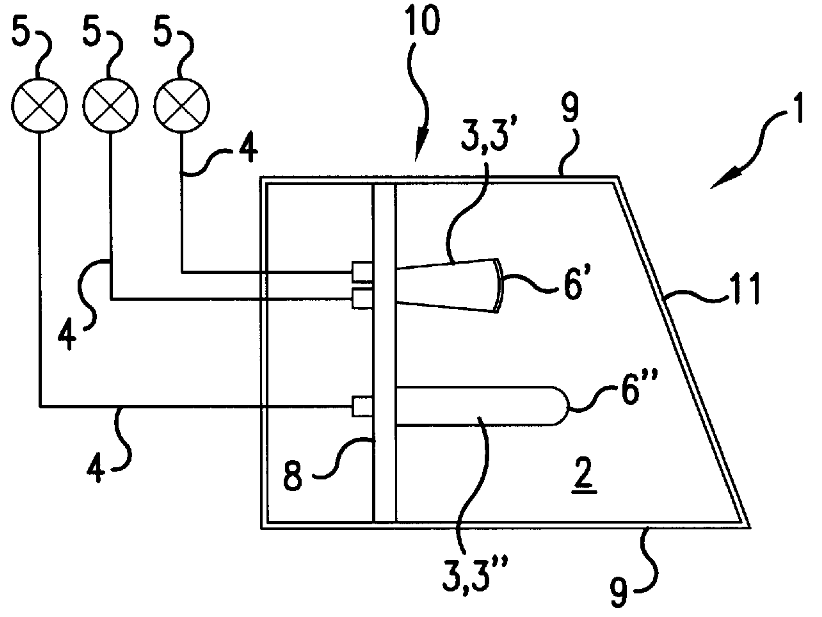
FIG. 1 is a schematic vertical section through a lighting device in accordance with the present invention.

FIG. 1 depicts a schematic view of a lighting device 1 for vehicles which essentially has one or several light decoupling elements 3 arranged in a decoupling bay 2, light guides or fiber optics 4 connected to the light decoupling elements 3 as well as light sources 5 arranged in a distance from the decoupling bay 2.

The light sources 5 are preferably arranged in the engine compartment of a vehicle. They can have the form of filament bulbs and be coupled in a distant end of the light guides 4 as related to the light-decoupling device 3 via a light-coupling device (not depicted). The light guide 4 is preferably made of a glass material and conducts the irradiated light from the light source 5 to the appropriate light-decoupling element 3.

A light decoupling element 3' can have a truncated contour to form a lower beam function, whereby a light emergence surface 6' may have a spherical shape. Another light decoupling element 3" can be formed to have a rectangular cross-section to provide a fog beam function whereby the light emergence surface 6" has the shape of an arc in the vertical direction.

The light decoupling elements 3 are adjacent with a rear 7 abutting a translucent carrier plate 8. For the decoupling of the light guides 4 on the rear 7 of the light decoupling elements 3, the carrier plate 8 has an opening into which an end of the light guide 4, as related to the light decoupling element, is inserted and removably connected to the the opening. The carrier plate 8 extends essentially vertically between the walls 9 of a barrel-shaped case 10. The case 10 is inserted in a body opening of the vehicle and closed by a translucent covering pane 11 covering the edge of the body opening and the case 10, respectively.

For the illumination of the decoupling bay 2 and the light decoupling elements 3, respectively, a decoupling bay lighting device 12 is envisaged in the decoupling bay 2 whose different variants are described in the following. The description of the decoupling bay lighting device 12 is provided by examples in connection with a light-decoupling element 3" with a fog beam function.

Figure 2:
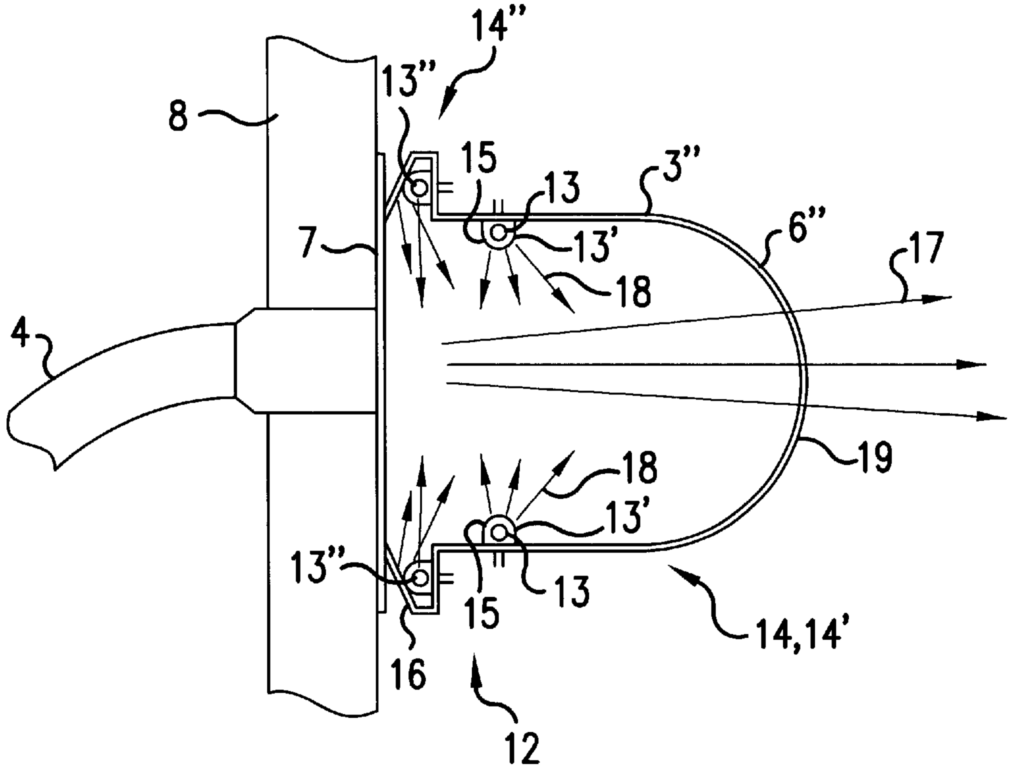
FIG. 2 is a schematic axial section of the decoupling bay lighting device of the lighting device in accordance with a first embodiment.

In FIG. 2, the decoupling bay lighting device 12 is shaped and has an additional light source 13 arranged in the peripheral section 14 of the light-decoupling device 3. In the present embodiment several additional light sources 13', 13" are provided in the form of light-emitting diodes. A first pair of additional light sources 13' is arranged in a lateral peripheral section 14' of the light decoupling element 3" whereby the additional light sources 13' are arranged opposing each other and are rimmed in recesses 15 of the light decoupling element 3". The additional light sources 13' are oriented transversally to the longitudinal axis of the light decoupling element 3" and each irradiate their light into the light decoupling element 3".

In a rear peripheral section 14" of the light decoupling element 3", another pair of additional light sources 13" is arranged whereby the additional light sources 13" are opposing each other and are oriented towards the rear 7. To facilitate the reflection of the light emitted by the additional light sources 13" in the direction of the optical axis of the light decoupling elements 3", it may be envisaged that the rear 7 of the light decoupling element 3" has a rounding 16 in an external edge, which has a metal-coating. Alternately the light emitted by the additional light sources 13" can be received and reflected through an appropriate structuring of the carrier plate 8 to be decoupled in a desired place inside the decoupling bay 2.

The additional light sources 13', 13" are connected with an electric power supply device via electric connection lines that are not depicted. They can be activated when the vehicle is started, preferably when the ignition key is turned such that while the vehicle is operating, a permanent illumination and lighting, respectively, of the decoupling bay 2 and/or light-decoupling device 3" are ensured. Only when a lighting function is activated and light rays 17 leave the light guide 4 and are decoupled through the light decoupling element 3",will the light 18 emitted by the additional light sources 13', 13" recede owing to its lower intensity such that, as required, the activation of the lighting function may concur with the deactivation of the lighting function of the decoupling bay lighting device 12.

The additional light sources 13', 13" are located in an area of the light-decoupling element 3" which is visually ineffective for the actual lighting function. This area is located in an area that is close to the rear 7 and distant to the optical axis of the light decoupling element 3".Preferably the additional light sources 13', 13" are oriented to the light decoupling element 3" such that by integrating the shape of the light decoupling element 3" a well-directed guidance and decoupling of the light 18 is facilitated. The light rays generated as described above for the lighting function can emerge diffusely or converge from a face 19 of the light decoupling element 3".

Figure 3:
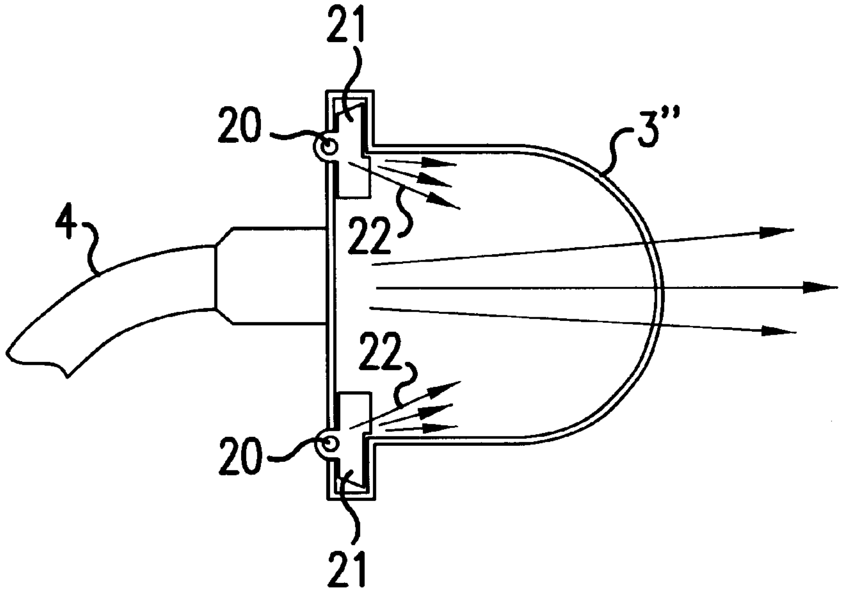
FIG. 3 is a schematic axial section of the decoupling bay lighting device in accordance with a second embodiment.

In accordance with a second embodiment as shown in FIG. 3, an additional light source 20 is integrated into a molded component 21 that is fixed to the light decoupling element 3" in an outermost edge of the rear 7 of said light decoupling element 3" and forms shoulders of the light decoupling element 3".The molded component 21 can have an optical part with a structure on one face such that the light 22 emitted from the additional light source 20 is directed and coupled into the light decoupling element 3".

Figure 4:
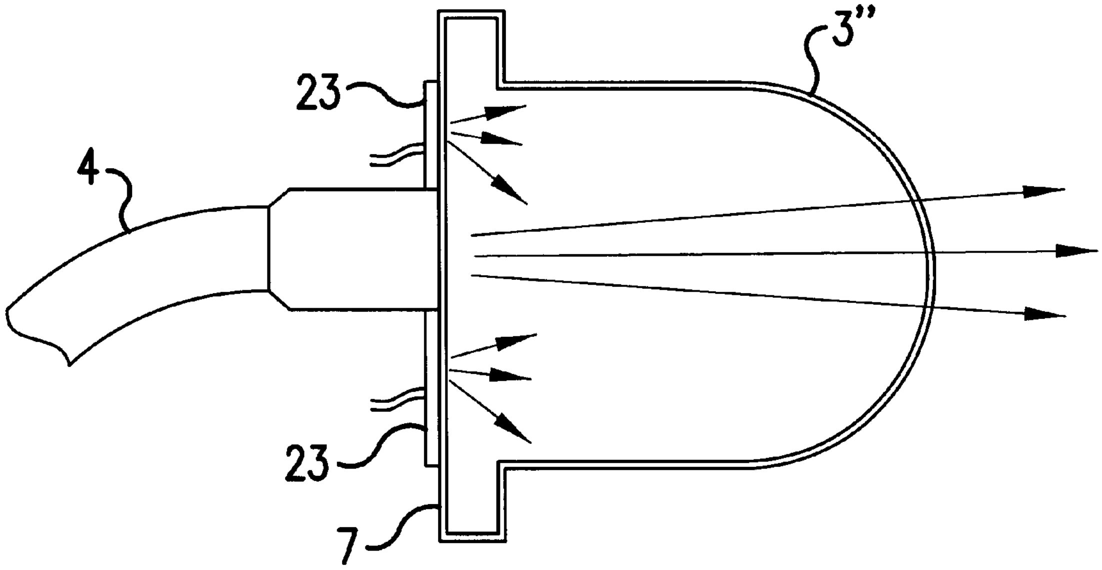
FIG. 4 is schematic axial section of the decoupling bay lighting device in accordance with a third embodiment.

In accordance with another embodiment as shown in FIG. 4, the rear 7 of the light decoupling element 3" can be fitted with a surface of an electro-luminescent foil 23 that is supplied with energy via a connection line that is not depicted. This ensures a predetermined color is applied to the translucent light decoupling element 3" such that the light decoupling element 3" has a certain color and light intensity when viewed from the outside. Preferably the entire rear 7 of the light element 3" with the exception of the connection for the light guide 4 is fitted with such a foil 23.

Figure 5:
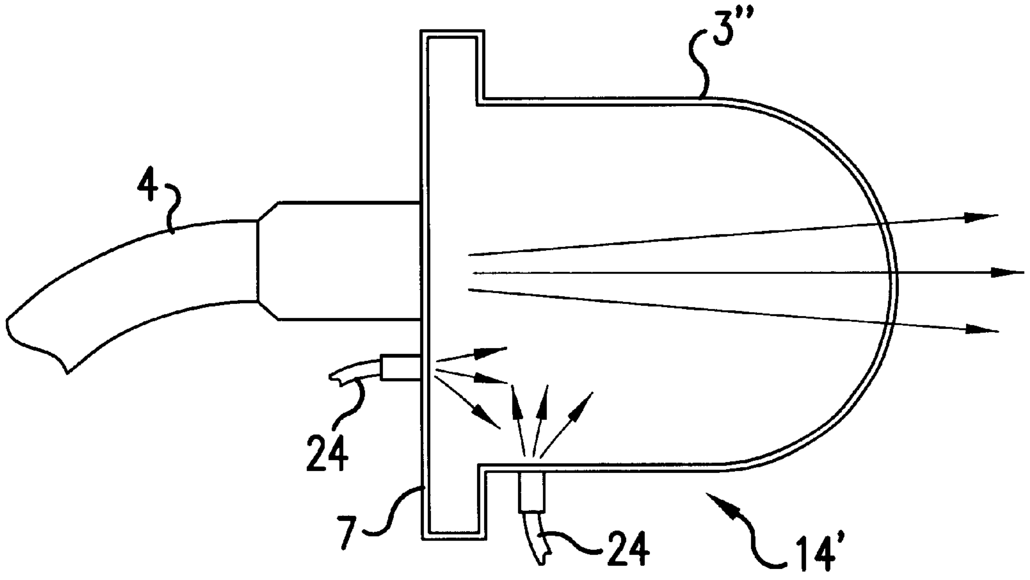
FIG. 5 is schematic axial section of the decoupling bay lighting device in accordance with a fourth embodiment.

In accordance with a further embodiment as shown in FIG. 5, the end of an additional light guide 24 is fitted to a peripheral area of the light-decoupling element 3" and connected to an additional light source that is not depicted. The additional light source may—as the light source 5 for the lighting function—be arranged in a distance inside the engine compartment. To provide a better illumination of the light decoupling element 3", one additional light guide 24 each is envisaged on the opposing sides of said light decoupling element on the side edge section 14' and on the rear 7, whereby the additional light guide 24 oriented transversally to the optical axis of the light decoupling element 3" is essentially used for an illumination in the vertical direction, and the additional light guide 24 arranged in parallel with the light decoupling element 3" is essentially used for horizontal illumination of the light decoupling element 3".

Figure 6:
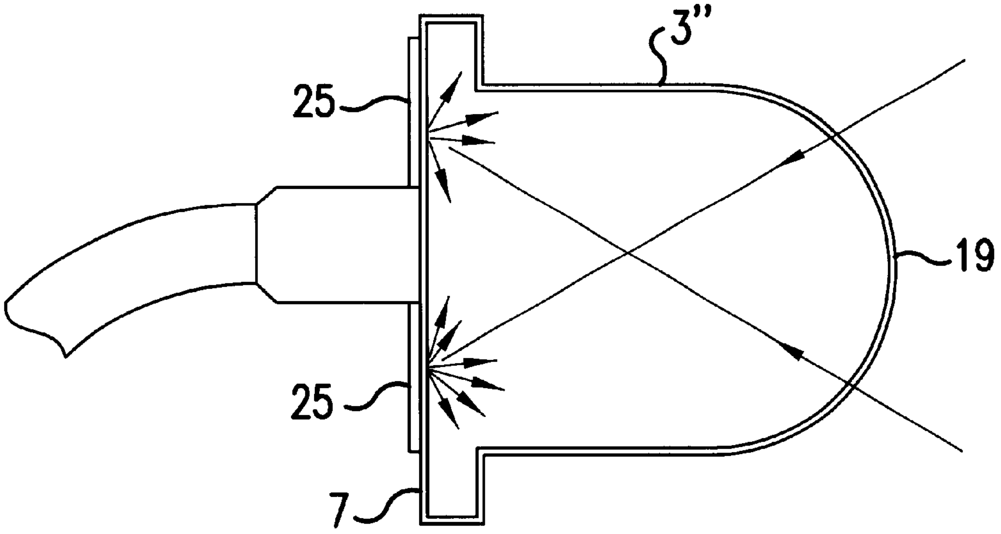
FIG. 6 is schematic axial section of the decoupling bay lighting device in accordance with a fifth embodiment.

In accordance with another embodiment of the invention as shown in FIG. 6, the rear 7 of the light decoupling element 3 is fitted with a coating 25 such that the external light from the ambience of the light decoupling element 3 and entering into and roaming in said light decoupling element 3 is reflected and directed back in the direction of the face 19. The coating can be provided in the form of a foil or a vapor coating and effects the lighting of the light-decoupling element 3", as required, by generating a color impression to the viewer.

Figure 7:
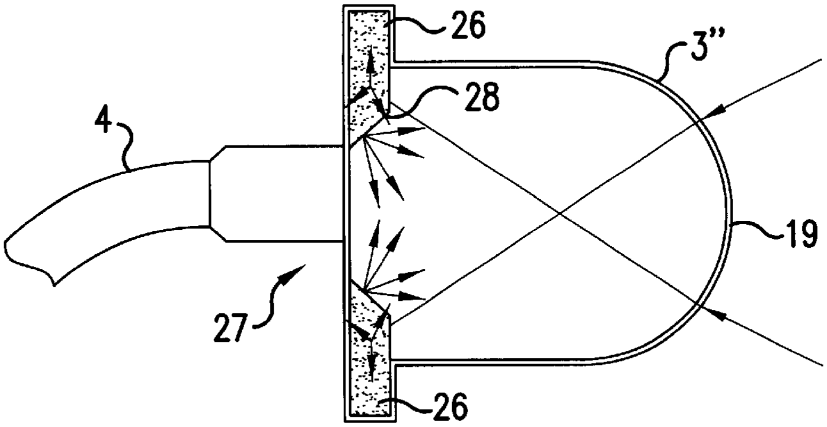
FIG. 7 is schematic axial section of the decoupling bay lighting device in accordance with a sixth embodiment.

In accordance with another embodiment as shown in FIG. 7, an external light collector 26 is arranged in a rear peripheral area of the light-decoupling element 3". The external light collector 26 has a thickness of between 5 and 50 mm and extends essentially from a central coupling area 27 of the light guide 4 to an outer peripheral section. A surface of the external light collector 26 that turns radially to the center and is provided in the form of an inclined surface 28 such that the light directed inside the external light collector 26 is decoupled homogeneously to the direction of the face 19 of the light decoupling element 3".The external light collector 26 is a component of the light decoupling element 3" and is manufactured integrally with the light decoupling element 3"; the only difference is that of the material used.

Figure 8:
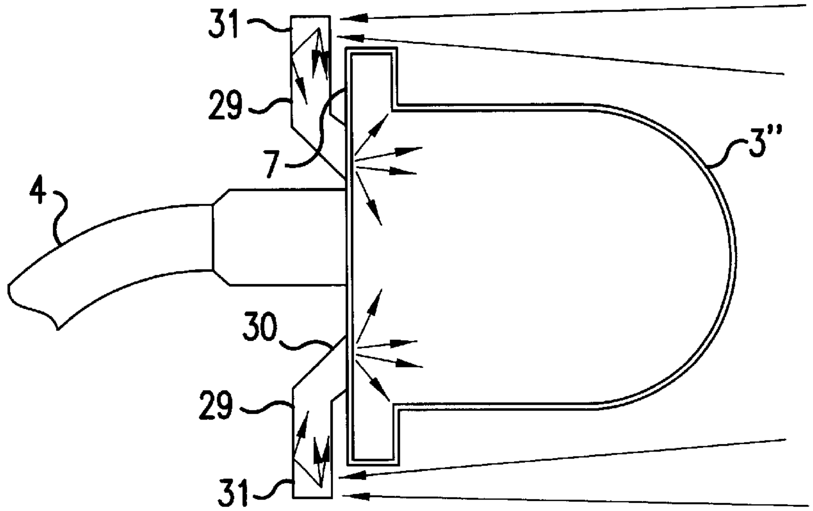
FIG. 8 is schematic axial section of the decoupling bay lighting device in accordance with a seventh embodiment.

In accordance with another embodiment of the invention as shown in FIG. 8, an external light collector 29 is provided which is arranged outside the light decoupling element 3" and mounted to the rear 7 of the light decoupling element 3" together with an external light decoupling element 30. The external light collector 29 extends from the area close to the light guide 4 in a lateral direction to the outside by forming an external light coupling element 31 projecting over the side peripheral section (flange-shaped step) of the light decoupling element 3". This measure specifically allows to receive direct external light entering from the ambience and to direct such light to the light decoupling element 3" for the illumination and lighting of the light decoupling element 3".

Figure 9:
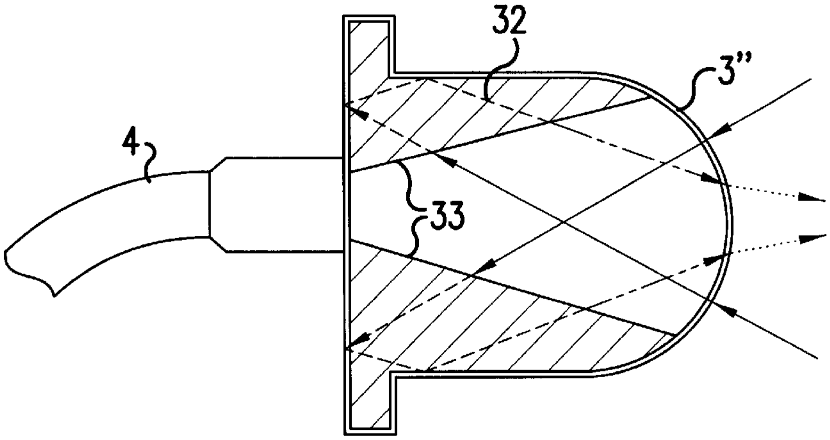
FIG. 9 is schematic axial section of the decoupling bay lighting device in accordance with an eighth embodiment.

In accordance with another embodiment of the invention as shown in FIG. 9 the decoupling bay lighting device is formed by a coloring 32 of the light decoupling element 3". This coloring 32 affects an area of the light decoupling element 3" that is visually ineffective for the lighting function of the light decoupling element 3" such that in concert with the external light the light decoupling element 3" gives a colored impression. For example, depending on the coloring a red, green or blue color character, or the like, is emitted. The area of the coloring 32 extends in a side peripheral area of the light-decoupling element 3", which is delimited by limiting beams 33 of the light beams directed through the light guide 4 which also contribute to generating the actual lighting function. Thus, the coloring 32 delimits the central area of the light-decoupling element 3" in the form of a light cone.

Alternately the aforementioned embodiments of the decoupling bay lighting device can also be used with a marker lighting function. The actual light-decoupling element provided for the lighting function is not needed in that case.

As described above, the carrier plate 8 has in addition to its carrying function a light technical function. As an additional light guiding element it can be used to receive external light or additional light introduced for illumination and distribute it into the decoupling bay 2 such that a homogeneous illumination of the decoupling bay 2 is possible. Preferably the carrier plate 8 has an optical structure (prism structure) effecting a reflection to the direction of the covering pane 11 of the case 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lighting device for a vehicle with a light guide guiding light emitted from a first light source into a decoupling bay of a vehicle, comprising at least one light-decoupling element coupled in the decoupling bay and connected to an end of the light guide, said light decoupling element emits light according to a predetermined distribution of light into the ambience, a decoupling bay lighting device including a second light source, said decoupling bay lighting device being integrated with the light decoupling element independently of said first light source for the purpose of illuminating the decoupling bay and said light decoupling element.

2. The lighting device in accordance with claim 1, wherein the decoupling bay lighting device is oriented in the light decoupling element such that light emitted from the decoupling bay lighting device is irradiated essentially in the light effusion direction of the light decoupling element.

3. The lighting device in accordance with claim 1, wherein the decoupling bay lighting device is oriented in the light decoupling element such that light emitted from the decoupling bay lighting device generates a light distribution essentially above a light/dark limit of a light distribution generated by the light decoupling element.

4. The lighting device in accordance with claim 1, wherein the decoupling bay lighting device is arranged in a peripheral section of the light decoupling element that is visually ineffective during the operating status of the light decoupling element.

5. The lighting device in accordance with claim 1, wherein the decoupling bay lighting device is arranged in an area of a lateral and/or rear peripheral section of the light decoupling element.

6. The lighting device in accordance with claim 1, wherein the decoupling bay lighting device (12) can be activated independently of the operating status of the light decoupling element (3, 3', 3") and that the decoupling bay lighting device (12) comprises at least one of an one additional light source (13, 20) and one additional light decoupling element (24) coupled with one additional light guide.

7. The lighting device in accordance with claim 6, wherein the additional light source (13, 20) or the additional light decoupling element (24) is arranged in a recess (15) or on a peripheral surface of the light decoupling element (3, 3', 3") such that light (22) emitted by the additional light source (13, 20) or the additional light decoupling element (24) in concert with at least one visually effective peripheral surface (front 19) of the light decoupling element (3, 3', 3") merges from the light decoupling element (3, 3', 3") as diffuse or converging rays.

8. The lighting device in accordance with claim 7, wherein the additional light source (13, 20) or the additional light-decoupling element (24) is connected with the light-decoupling element (3, 3', 3") with one of a positive fit and a material fit.

9. The lighting device in accordance with claim 6, wherein the additional light source (20) is held as a mould component in a peripheral section of the light-decoupling element (3, 3', 3").

10. The lighting device in accordance with claim 6, wherein the additional light source (20) is preceded by an optical component and that the additional light source (20) and the optical component are rimmed in the common mould component (21).

11. The lighting device in accordance with claim 1, wherein the decoupling bay lighting device (12) comprises a coating (25) arranged on a rear peripheral section (7) of the light-decoupling element (3, 3', 3") such that light is emitted or reflected by the coating (25).

12. The lighting device in accordance with claim 11, wherein the coating (25) is provided in the form of an electro-luminescent foil (29) that can be connected to an electric power supply device via a connecting line.

13. The lighting device in accordance with claim 11, wherein the coating (25) is provided as a foil for reflecting external light from the ambience that enters the light-decoupling element (3, 3', 3").

14. The lighting device in accordance with claim 13, wherein the reflecting foil is colored.

15. The lighting device in accordance with claim 11, wherein the coating (25) is vapor-deposited onto the rear peripheral section (7) of the light-decoupling element (3, 3', 3").

16. The lighting device in accordance with claim 1, wherein the decoupling bay lighting device (12) comprises an external light collector (26, 29) that is arranged in the area of a rear peripheral section (7) of the light decoupling element (3, 3', 3") with an external light coupling element (31) for coupling external light and with an external light decoupling element (30) for decoupling of the external light into the light decoupling element (3, 3', 3").

17. The lighting device in accordance with claim 16, wherein the external light collector (26) is arranged essentially inside and transversal to the optical axis of the light decoupling element (3, 3', 3") by being formed on at least rear (7) of said light decoupling element (3, 3', 3").

18. The lighting device in accordance with claim 16, wherein the external light collector (29) is arranged essentially outside the light decoupling element (3, 3', 3") on the rear (7) of said light decoupling element (3, 3', 3") whereby the external light coupling element (31) projects at least over the side edge section of the light decoupling element (3, 3', 3") and whereby the external light coupling element (30) is connected with one peripheral surface of the light decoupling element (3, 3', 3").

19. The lighting device in accordance with claim 1, wherein the decoupling bay lighting device (12) is provided by a coloring (32) of an area of the light decoupling element (3, 3', 3") that is visually ineffective for the lighting function.

20. The lighting device in accordance with claim 1, wherein the decoupling bay lighting device (12) comprises an optical carrier plate (8) that extends along a rear (7) of the light decoupling element (3, 3', 3") and carries one of the light decoupling element (3, 3', 3") and an additional light source (20) and an additional light decoupling element (24).

21. The lighting device in accordance with claim 20, wherein the carrier plate (8) is one of translucent, colored and fitted with an optical structure.

22. Lighting device in accordance with claim 20, wherein the carrier plate (8) is held positively on a wall (9) of a case (10) delimiting the decoupling bay (2).

23. A method for the illumination of a decoupling bay of a vehicle, wherein a light of a first light source is transmitted to a light decoupling element in a decoupling bay to be decoupled in accordance with a predetermined light distribution, wherein a decoupling bay lighting device with a second light source is integrated with the light decoupling element independently of said first light source and can be switched on independently of transmission of light from the first light source to the light decoupling element for the purpose of providing ambient and background illumination of the decoupling bay.

24. The method in accordance with claim 23, wherein a light source assigned to the decoupling bay lighting device can be switched on and off synchronously with a central electric system facilitating the operation of the vehicle.

25. The method in accordance with claim 24, wherein the decoupling bay lighting device emits a light of essentially lower luminous intensity than the one irradiated from the light decoupling element.

* * * * *